United States Patent
Nava

(10) Patent No.: US 6,204,342 B1
(45) Date of Patent: *Mar. 20, 2001

(54) THICKENING ACTIVE H-CONTAINING RESIN WITH POLYCARBODIIMIDE

(75) Inventor: Hildeberto Nava, Cary, NC (US)

(73) Assignee: Reichhold Chemicals, Durham, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/919,086

(22) Filed: Aug. 27, 1997

(51) Int. Cl.$^7$ ............... B32B 17/04; C08L 75/04; C08L 67/06; C08L 71/00
(52) U.S. Cl. ............. 525/440; 428/297.4; 524/589; 524/590; 525/403; 525/457; 525/907
(58) Field of Search .................... 525/424, 453, 525/457, 907, 403, 440; 524/589, 590; 428/297.4

(56) References Cited

U.S. PATENT DOCUMENTS

| | | | |
|---|---|---|---|
| 4,071,503 | * 1/1978 | Thomas et al. | 525/440 |
| 4,169,866 | * 10/1979 | Von Bonin et al. | 525/440 |
| 4,535,110 | 8/1985 | Iseler et al. | 524/196 |
| 4,845,161 | * 7/1989 | Richardson | 525/399 |
| 4,861,828 | * 8/1989 | Waggoner | 525/132 |
| 4,916,023 | * 4/1990 | Kawabata et al. | 428/482 |
| 5,008,363 | 4/1991 | Mallon et al. | 528/49 |
| 5,047,588 | 9/1991 | Taylor | 564/252 |
| 5,066,705 | * 11/1991 | Wickert | 524/457 |
| 5,081,173 | 1/1992 | Taylor | 524/195 |
| 5,106,875 | 4/1992 | Horn et al. | 521/137 |
| 5,115,072 | 5/1992 | Nava et al. | 528/67 |
| 5,212,234 | 5/1993 | Van Gasse et al. | 525/43 |
| 5,272,204 | 12/1993 | Akimoto et al. | 524/700 |
| 5,274,067 | 12/1993 | Kressdorf et al. | 528/75 |
| 5,276,096 | 1/1994 | Serdiuk et al. | 525/123 |
| 5,281,634 | 1/1994 | Hesse et al. | 523/514 |
| 5,296,545 | 3/1994 | Heise | 525/28 |
| 5,324,795 | 6/1994 | Suenaga | 525/444 |
| 5,334,670 | 8/1994 | Uchida et al. | 525/440 |
| 5,359,005 | 10/1994 | Kania et al. | 525/203 |
| 5,371,148 | 12/1994 | Taylor et al. | 525/293 |
| 5,371,167 | 12/1994 | Rehfuss et al. | 528/73 |
| 5,373,080 | 12/1994 | Imashiro et al. | 528/67 |
| 5,382,626 | 1/1995 | Credali et al. | 525/126 |
| 5,393,829 | 2/1995 | Verleg et al. | 525/28 |
| 5,418,310 | 5/1995 | Kangas | 528/59 |
| 5,439,982 | 8/1995 | Taylor et al. | 525/293 |
| 5,498,747 | * 3/1996 | Pohl et al. | 528/83 |
| 5,504,241 | * 4/1996 | Pohl et al. | 528/83 |
| 5,597,942 | * 1/1997 | Pohl et al. | 528/83 |
| 5,654,479 | 8/1997 | Lehrich et al. | 564/252 |

FOREIGN PATENT DOCUMENTS

| | | | |
|---|---|---|---|
| 157635 | * 10/1985 | (EP) | . |
| 527371A2 | 8/1991 | (EP) | . |
| 467032A2 | 1/1992 | (EP) | . |
| 808828A2 | 11/1997 | (EP) | . |
| 906.519 | 6/1992 | (GB) | . |
| 9-188807 | * 7/1997 | (JP) | . |

OTHER PUBLICATIONS

Dow technical information bulletin for Isonate 143L, 3 pages, 1998.*

Harper et al., Use of Liquid MDI Products for Polyurethane Reactive Hot Melt Resins, The Dow Chemical Company, pp. 181–190, 1998.*

CA AN:76:15516, "Peroxide . . . elastomers", Elmer et al., Apr. 1971.*

* cited by examiner

Primary Examiner—Robert E. L. Sellers
(74) Attorney, Agent, or Firm—Myers Bigel Sibley & Sajovec, P.A.

(57) ABSTRACT

A method of thickening a resin comprises blending (1) a resin containing active hydrogens, such as an unsaturated polyester (2) a polycarbodiimide, and (3) an organic diluent to form a reactive mixture; and reacting the resin containing active hydrogens and the polycarbodiimide such that the resin and polycarbodiimide become chemically bound.

17 Claims, No Drawings

THICKENING ACTIVE H-CONTAINING RESIN WITH POLYCARBODIIMIDE

FIELD AND BACKGROUND OF THE INVENTION

The present invention relates to a method of chemically thickening resins.

Various resins, such as ethylenically unsaturated resins, are utilized in a wide variety of end-use applications. For example, unsaturated polyester resins are particularly desirable as molded articles including bathtubs, water tanks, and automobile parts. In these instances, reinforcing fibers are typically blended with the resins to impart strength and lightweight dimensional stability to the article. Sheet molding compound ("SMC"), for example, is a mixture or combination which includes one or more resins, along with reinforcing fibers and inert fillers.

In particular, the automobile industry is increasingly using molded articles made from reinforced resins in place of heavier metal articles in order to provide more fuel efficient automobiles. Strength requirements in such applications are significant, and accordingly fibrous filaments are employed in high amounts, typically above 50 percent based on the weight of the article. Resin compositions containing such a high fiber amount, however, are often difficult to mold into articles with the reinforcing materials uniformly distributed.

More specifically, the production of molded articles with intricate shapes involves squeezing the reinforced resin material between male and female sections of a mold. Often during this process, a sizeable quantity of resin is forced out of the mold, typically exceeding 30 percent of the total weight. As a result of the sizeable resin loss, the formed article often becomes more highly filled in the region of the preform and is sparingly filled at the mold extremities or locations of maximum flowout.

To help enhance the physical properties of such formed articles, thickening materials have thus been employed. Conventional thickening materials have been in the form of metal oxides. Resins using the metal oxides, however, have been observed to display undesirable physical properties relating to brittleness and reduced moisture resistance.

As an alternative, isocyanate-containing resins have been proposed as chemical thickeners, such as described, for example, in U.S. Pat. No. 4,232,133. The '133 patent discloses the use of gels of ethylenically unsaturated monomer solutions which contain isocyanate resins. The resins are disclosed to be useful as SMC. The isocyanate resins are potentially advantageous relative to the metal oxides in that they exhibit improved stability and can be matured to form moldable compositions within a few hours.

Difficulties exist in using isocyanates as thickening resins. In particular, isocyanates in general are highly moisture sensitive. In such instances, side reactions often take place which produce urea and carbon dioxide. As a result, thickening tends to be non- uniform, thus adversely affecting thermal and hydrolytic stability of the resin, and resin physical properties.

In view of the above, there remains a need in the art for a method which allows for a resin to be chemically thickened while minimizing adverse effects to physical properties of the resulting article formed from the thickened resin.

SUMMARY OF THE INVENTION

It is therefore an object of the present invention to provide a method for chemically thickening a resin which minimizes adverse physical effects to the thickened resin.

It is a further object of the invention to provide a cured resin from the chemically thickened resin.

To this end and others, the present invention provides a method of thickening a resin. The method comprises blending (1) a resin containing active hydrogens; and (2) a polycarbodiimide, and (3) an organic diluent to form a reactive mixture, and then reacting the resin containing active hydrogens and the polycarbodiimide to chemically bind the resin and polycarbodiimide. Resins which contain active hydrogens are preferably saturated polyester resins, unsaturated polyester resins, vinyl ester resins, polyurethane resins, and mixtures thereof.

The chemically bound resin may further be cured to form a crosslinked resin material. In one embodiment, the curing step may be carried out in the presence of an initiator. In addition to the initiator, the curing step may be carried out in the presence of a promoter.

The polycarbodiimide of the present invention is preferably formed from a reaction between an isocyanate-containing intermediate and a diisocyante. The isocyanate-containing intermediate is preferably formed from a reaction between a component containing active hydrogens and a diisocyanate. In another embodiment, the polycarbodiimide may be formed from the polymerization of diisocyanates and the subsequent reaction with a component containing active hydrogens to form the polycarbodiimide.

DETAILED DESCRIPTION OF THE PREFERRED EMBODIMENT

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

The present invention relates to a method of thickening a resin containing active hydrogens. The method includes blending a resin containing active hydrogens, a polycarbodiimide, and an organic diluent to form a reactive mixture. The polycarbodiimide is preferably present in the organic diluent when added to the resin containing active hydrogens during this step. The reactive mixture preferably contains greater than about 5 percent by weight of polycarbodiimides.

Subsequently, the resin containing active hydrogens and the polycarbodiimide are reacted to chemically bind the resin containing active hydrogens and the polycarbodiimide, in other words, chemically thicken the resin containing active hydrogens. This step may be carried out at a temperature between about 5° C. and about 60° C. The chemically thickened resin preferably has a viscosity ranging from about 30,000 centipoise to about 50 million centipoise, and more preferably from about 100,000 centipoise to about 20 million centipoise.

Additionally, the chemically bound resin may be cured to form a cured (i.e., crosslinked) resin material. The curing is preferably carried out at a temperature ranging from about 40° C. to about 150° C., and more preferably from about 50° C. to about 100° C. The invention is advantageous in that the glass transition temperature ($T_g$) of cured resin material is enhanced by virtue of the method disclosed herein. Preferably, the $T_g$ of the cured resin material increases from about 5 percent to about 600 percent upon undergoing thickening and curing, and more preferably from about 10 percent to about 300 percent.

As a result of this elevation in $T_g$, it is believed that the physical properties of the cured resin material subsequent to thickening and curing are enhanced. Preferably, the cured resin material has a flexural strength ranging from about 3000 psi to about 80,000 psi; a tensile strength ranging from about 1000 psi to about 50,000 psi; and a percent elongation ranging from about 1 to about 1000. In addition to the above, it should be appreciated that various types of resins may have differing preferred ranges of physical property values. For example, cured unsaturated polyester resins preferably have tensile strengths ranging from about 3000 psi to about 50,000 psi and elongations ranging from about 1 to about 10 percent, while cured hot melt adhesives preferably have tensile strengths ranging from about 800 to about 5000 psi and elongations ranging from about 70 to about 1000.

Preferably, the reactive mixture contains between about 3 to about 50 percent by weight of polycarbodiimide, more preferably between about 3 and about 20 weight percent polycarbodiimide, and most preferably between about 6 and about 12 weight percent polycarbodiimide.

The invention also relates to a method of forming a reinforced product. The method comprises blending (1) a resin containing active hydrogens; (2) a polycarbodiimide; and (3) an organic diluent to form a reactive mixture; combining fibrous reinforcement material with the reactive mixture; reacting the resin containing active hydrogens and the polycarbodiimide to chemically bind the resin containing active hydrogens and the polycarbodiimide; and curing the chemically bound resin to form a crosslinked reinforced product.

The resin which contains active hydrogens may be selected from a number of resins well known to those skilled in the art. For the purposes of the invention, the term "resin containing active hydrogens" refers to any resin which contains functional groups containing active hydrogens. Functional groups containing active hydrogens can be defined as those which are capable of reacting with polycarbodiimide repeating units (N=C=N). Suitable functional groups including, for example, hydroxyl, carboxyl, amino, phenol, silanol, —P—OH, —P—H, as well as other appropriate substituents. Resins containing active hydrogens include, but are not limited to, saturated polyester resins (e.g., resins employed in hot melt adhesives and powder coatings), unsaturated polyester resins (e.g., resins used in forming molded articles), aliphatic and aromatic polyethers, vinyl ester resins (e.g., resins used in filament winding and open and closed molding), polyurethanes, and mixtures of any of the above.

For the purposes of the invention, unsaturated polyester resins, saturated polyester resins, and vinyl ester resins are preferably employed. An unsaturated polyester resin may be formed from conventional methods. Typically, the resin is formed from the reaction between a polyfunctional organic acid or anhydride and a polyhydric alcohol under conditions known in the art. The polyfunctional organic acid or anhydride which may be employed are any of the numerous and known compounds. Suitable polyfunctional acids or anhydrides thereof include, but are not limited to, maleic acid, fumaric acid, citraconic acid, itaconic acid, glutaconic acid, phthalic acid, isophthalic acid, terephthalic acid, cyclohexane dicarboxylic acid, succinic anhydride, adipic acid, sebacic acid, azealic acid, malonic acid, alkenyl succinic acids such as n-dodecenylsuccinic acid, docecylsuccinic acid, octadecenylsuccinic acid, and anhydrides thereof. Lower alkyl esters of any of the above may also be employed. Mixtures of any of the above are suitable.

Additionally, polybasic acids or anhydrides thereof having not less than three carboxylic acid groups may be employed. Such compounds include 1,2,4-benzenetricarboxylic acid, 1,3,5-benzene tricarboxylic acid, 1,2,4-cyclohexane tricarboxylic acid, 2,5,7-naphthalene tricarboxylic acid, 1,2,4-naphthalene tricarboxylic acid, 1,3,4-butane tricarboxylic acid, 1,2,5-hexane tricarboxylic acid, 1,3-dicarboxyl-2-methyl-2-carboxymethylpropane, tetra (carboxymethyl)methane, 1,2,7,8-octane tetracarboxylic acid, and mixtures thereof.

Suitable polyhydric alcohols which may be used in forming the unsaturated polyester resin include, but are not limited to, ethylene glycol, diethylene glycol, propylene glycol, dipropylene glycol, 1,3-butanediol, 1,4-butanediol, 1,3 hexanediol, neopentyl glycol, 2-methyl-1,3-propanediol, 1,3-butylene glycol, 1,6-hexanediol, hydrogeneated bisphenol "A", cyclohexane dimethanol, 1,4-cyclohexanol, ethylene oxide adducts of bisphenols, propylene oxide adducts of bisphenols, sorbitol, 1,2,3,6-hexatetrol, 1,4-sorbitan, pentaerythritol, dipentaerythritol, tripentaerythritol, sucrose, 1,2,4-butanetriol, 1,2,5-pentanetriol, glycerol, 2-methylpropanetriol, 2-methyl-1,2,4-butanetriol, trimethylol ethane, trimethylol propane, and 1,3,5-trihydroxyethyl benzene. Mixtures of the above alcohols may be used.

The vinyl ester resins employed in the invention include the reaction product of an unsaturated monocarboxylic acid or anhydride with an epoxy resin. Exemplary acids and anhydrides include (meth)acrylic acid or anhydride, α-phenylacrylic acid, α-chloroacrylic acid, crotonic acid, mono-methyl and mono-ethyl esters of maleic acid or fumaric acid, vinyl acetic acid, sorbic acid, cinnamic acid, and the like, along with mixtures thereof. Epoxy resins which may be employed are known and include virtually any reaction product of a polyfunctional halohydrin, such as epichlorohydrin, with a phenol or polyhydric phenol. Suitable phenols or polyhydric phenols include, for example, resorcinol, tetraphenol ethane, and various bisphenols such as Bisphenol "A", 4,4'-dihydroxydiphenyl sulfone, 4,4'-dihydrohy byphenyl, 4,4'-dihydroxydiphenyl methane, 2,2'-dihydroxydiphenyloxide, and the like. Novolac epoxy resins may also be used. Mixtures of any of the above may be used. Additionally, the vinyl ester resins may have pendant carboxyl groups formed from the reaction of esters and anhydrides and the hydroxyl groups of the vinyl ester backbone.

As alluded to hereinabove, the resins containing active hydrogens are particularly well suited for forming reinforced products (e.g., articles), including those used in automobile body panels. The unsaturated resins may be used alone or in conjunction with other appropriate materials. When the resins are combined (e.g., impregnated) with other materials (e.g., fibrous reinforcement materials and filler materials), they are typically used to form reinforced products such as pre-pregs by any of the known processes such as, for example, pultrusion or sheet molding compounding. Any conventionally known fibrous reinforcement material may be used including fiberglass, polyester, carbon, metal, graphite, high modulus organic fibers (e.g., aromatic polyamides, polybenzimidazoles, and aromatic polyimides), other organic fibers (e.g., polyethylene, liquid crystals, and nylon), and natural fibers. The fibrous materials may be incorporated into the resin in accordance with techniques which are known in the art. Filler materials may include, but are not limited to, calcium carbonate, aluminum oxide, aluminum hydroxide, silica gel, barite, graphite powder, and the like. Mixtures of the above may also be used.

Saturated polyester resins and polyurethanes which are thickened include, for example, those described in U.S. Pat. Nos. 4,871,811; 3,427,346; and 4,760,111, the disclosures of which are incorporated herein by reference in their entirety.

The saturated polyester resins and polyurethanes are particularly useful in hot melt adhesives and pressure sensitive adhesive applications. Appropriate saturated polyester resins include, but are not limited to, crystalline and amorphous resins. The resins may be formed by any suitable technique. For example, the saturated polyester resin may be formed by polycondensating an aromatic or aliphatic di-or polycarboxylic acid and an aliphatic or alicyclic di- or polyol or its prepolymer. Optionally, either the polyols may be added in excess to obtain hydroxyl end groups or the dicarboxylic monomers may be added in excess to form carboxylic end groups. Suitable polyurethane resins may be formed by the reaction of diols or polyols as described in U.S. Pat. No. 4,760,111 along with diisocyanates. The diols are added in an excess to obtain hydroxyl end groups at the chain ends of the polyurethane.

Polycarbodiimides which may be employed in the present invention include those which are known in the art. Exemplary polycarbodiimides are described in U.S. Pat. Nos. 5,115,072; 5,081,173; 5,008,363; and 5,047,588; the disclosures of which are incorporated herein by reference in their entirety. The polycarbodiimides can include aliphatic, cycloaliphatic, or aromatic polycarbodiimides.

The polycarbodiimides can be prepared by a number of known reaction schemes. Preferably, the polycarbodiimides are synthesized by reacting an isocyanate- containing intermediate and a diisocyante under suitable reaction conditions. The isocyanate containing intermediate is formed by the reaction between a component, typically a monomer containing active hydrogens, and a diisocyanate. Included are also polycarbodiimides prepared by the polymerization of isocyanates to form a polycarbodiimide, which subsequently react with a component containing active hydrogens.

Components (e.g., monomers) containing active hydrogens, which may be employed are well known and numerous, with monomers being typically utilized. Examples of such monomers include, but are not limited to, acrylates, alcohols, amines, esters, polyesters, thiols, phenols, aromatic and aliphatic polyethers, siloxanes, phosphorus-containing materials, olefins, unsaturated aromatic monomers, and mixtures thereof. Alcohols are typically used, with monofunctional alcohols being preferably employed. Monofunctional alcohols which may be used include, for example, ethanol, butanol, propanol, hexanol, octanol, ethylhexyl alcohol, and longer-chain alcohols (i.e., those alcohols containing up to 50 carbon atoms) and their isomers.

Other monomers having active hydrogens which may be used include, for example, acrylic acid, methacrylic acid, acetic acid, phenylacetic acid, phenoxyacetic acid, propionic acid, hydrocynnamic acid, and the like. Hydroxyalkyl acrylates or methacrylates such as hydroxyethyl acrylate, hydroxyethyl methacrylate, hydroxypropyl acrylate, hydroxypropyl methacrylate, hydroxybutyl acrylate, hydroxybutyl methacrylate, and the like may also be employed. Polyols can be additionally be used including, but not limited to, ethylene glycol; 1,2 and 1,3-propylene glycol; 1,4 and 2,3-butylene glycol; 1,5- pentane diol; 1,6-hexane diol; 1,8-octane diol; neopentyl glycol; 1,4-bis-hydroxymethyl cyclohexane; 2-methyl-1,3-propane diol; glycerol; trimethylol propane; 1,2,6-hexane triol; trimethylol ethane; pentaerythritol; quinitol; mannitol; sorbitol; diethylene glycol; triethylene glycol; tetraethylene glycol; 1,4-butanediol; polyethylene glycols having a molecular weight of up to 400; dipropylene glycol; ethoxylated and propoxylated bisphenol "A"; polybutylene glycols having a molecular weight of up to 400; methyl glucoside; diethanolamino-N-methyl phosphonic acid esters; castor oil; diethanolamine; N-methyl ethanolamine; and triethanolamine. Mixtures of any of the above may be used. Any of the above compounds may also include any one or a combination of halogens such as chlorine, fluorine, bromine, or iodine; or phosphorus, or silicon groups.

Diisocyanates which are used in the above reactions are well known to the skilled artisan. For the purposes of the invention, diisocyantes include aliphatic, cycloaliphatic, araliphatic, aromatic and heterocyclic diisocyantes of the type described, for example, by W. Siefken in *Justus Liebigs Annalen der Chemie,* 562, pages 75 to 136, (1949) for example, those corresponding to the following formula:

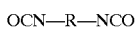

OCN—R—NCO wherein R represents a difunctional aliphatic, cycloaliphatic, aromatic, or araliphatic radical having from about 4 to 25 carbon atoms, preferably 4 to 15 carbon atoms, and free of any group which can react with isocyanate groups. Exemplary diisocyantes include, but are not limited to, toluene diisocyanate; 1,4-tetramethylene diisocyanate; 1,4-hexamethylene diisocyanate; 1,6-hexamethylene diisocyanate; 1,12-dodecane diisocyante; cyclobutane-1,3-diisocyanate; cyclohexane-1,3-diisocyanate; cyclohexane-1,4-diisocyanate; 1-isocyanato-3,3,5-trimethyl-5-isocyanatomethyl cyclohexane; 2,4-hexahydrotolylene diisocyanate; 2,6-hexahydrotolylene diisocyanate; 2,6-hexahydro-1,3-phenylene diisocyanate; 2,6-hexahydro-1,4-phenylene diisocyanate; per-hydro-2,4'-diphenyl methane diisocyanate; per-hydro-4,4'-diphenyl methane diisocyanate; 1,3-phenylene diisocyanate; 1,4-phenylene diisocyanate; 2,4-tolylene diisocyanate, 2,6-toluene diisocyanates; diphenyl methane-2,4'-diisocyanate; diphenyl methane-4,4'-diisocyanate; naphthalene-1,5-diisocyanate; 1,3-xylylene diisocyanate; 1,4-xylylene diisocyanate; 4,4'-methylene-bis (cyclohexyl isocyanate); 4,4'-isopropyl-bis-(cyclohexyl isocyanate); 1,4-cyclohexyl diisocyanate; 3-isocyanatomethyl-3,5,5-trimethylcyclohexyl isocyanate (IPDI); 1-methyoxy-2,4phenylene diisocyanate; 1-chloropyhenyl-2,4-diisocyante; p-(1-isocyanatoethyl)-phenyl isocyanate; m-(3-isocyanatobutyl)-phenyl isocyanate; and 4-(2-isocyanate-cyclohexyl-methyl)-phenyl isocyanate. Mixtures of any of the above may be employed. When deemed appropriate, a diisocyante may be employed which contains other functional groups such as hydroxy or amino functionality.

In the reaction involving the component containing active hydrogens and the diisocyanate, it is preferred to employ a catalyst. A number of catalysts known to the skilled artisan may be used for this purpose. Such catalysts include, but are not limited to, an organo tin catalyst such as dibutyl tin diacetate, dibutyl tin di-2-ethylhexoate, dibutyl tin dilaurate, dibutyl tin oxide, and the like. Tertiary amines, such as triethylamine, tributylamine, triethylene—diamine tripropylamine, and the like may also be used. Mixtures of the above catalysts may be used. The catalyst may be used in various suitable amounts, preferably between about 0.005 and about 0.50 percent based on the weight of the component containing active hydrogens and the diisocyanate.

The reaction between the component containing reactive hydrogens and the diisocyanate forms a isocyanate-containing intermediate. The isocyanate-containing intermediate is then reacted with any of the diisocyanates described herein to form a poly-carbodiimide. The latter reaction described above is preferably carried out in the presence of catalyst. Suitable catalysts which may be used include, for example, those described in U.S. Pat. No. 5,008,363; the disclosure of which is incorporated herein by reference in its entirety. Particularly useful classes of carbodiimide-forming catalysts are the phospholene-1-oxides and phospholene-1-sulfides. Representative compounds within these classes are triphenyl phosphine; 3-methyl- 1 -phenyl-3-phospholine 1-oxide; 1 -ethyl-phenyl-3-phospholine 1-oxide; 3-(4-methyl-3-pentynyl)-1-phenyl-3-phospholine 1-oxide; 3-chloro-1-phenyl-3-phospholine 1-oxide; 1,3-diphenyl-3-phospholine 1-oxide; 1-ethyl-3-phospholine 1-sulfide; 1-phenyl-3-phospholine 1-sulfide; and 2-phenylisophosphindoline 2-oxide; 1-phenyl-2-phospholene 1-oxide; 3-methyl-1-phenyl-2-phospholene 1-oxide; 1-phenyl-2-phospholene 1-sulfide; 1-ethyl-2-phospholene 1-oxide; 1-ethyl-3-methyl-2-phospholene 1-oxide; and 1-ethyl-3-methyl-2-phospholene 1-oxide. Other isomeric phospholenes corresponding to all the above-named compounds also can be used. Mixtures of any of the above may be used. The catalyst may be used in various suitable amounts, preferably from about 0.005 to about 10 percent based on the weight of the reactants, more preferably from about 0.02 to about 5 weight percent, and most preferably from about 0.03 to about 2 weight percent.

A vinyl monomer may also be included as a diluent with the polycarbodiimide and the unsaturated and saturated resins. Suitable monomers may include those such as, for example, styrene, alpha-methyl styrene, p-methyl styrene, divinyl benzene, divinyl toluene, ethyl styrene, vinyl toluene, tert-butyl styrene, monochloro styrene, dichloro styrene, vinyl benzyl chloride, fluorostyrene, and alkoxystyrenes (e.g., paramethoxy styrene). Other monomers which may be used include, for example, diallyl phthalate, hexyl acrylate, octyl acrylate, octyl methacrylate, diallyl itaconate, diallyl maleate, hydroxyethyl acrylate, hydroxyethyl methacrylate, hydroxypropyl acrylate, hydroxypropyl methacrylate, and mixtures thereof.

Other monomers that may be used include toluene, xylene, chlorobenzene, chloroform, tetrahydrofuran, ethyl acetate, isopropyl acetate, butyl acetate, butyl phthalate, acetone, methyl cellosolve acetate, cellosolve acetate, butyl cellosolve, methyl ethyl ketone, diethyl ketone, and cyclohexanone.

Any suitable polyfunctional acrylate may be used in the resin composition, including those described, for example, in U.S. Pat. No. 4,916,023 to Kawabata et al., the disclosure of which is incorporated by reference herein in its entirety. Such compounds include ethylene glycol dimethacrylate, butanediol dimethacrylate, hexanediol dimethacrylate, ethoxylated trimethylol propane triacrylate, trimethylolpropane tri(meth)acrylate, trimethylolpropane triacrylate, trimethylolmethane tetramethacrylate, pentaerythritol tetramethacrylate, dipentaerythritol tetramethacrylate, dipentaerythritol pentamethacrylate, dipentaerythritol hexamethacrylate, ethoxylated polyhydric phenol diacrylates and dimethacrylates containing from 1 to 30 ethylene oxide units per OH group in the phenol, propoxylated polyhyric phenol diacrylates and dimethacrylates containing from 1 to 30 propylene oxide groups per OH groups in the phenol. Examples of some useful di-and polyhydric phenols include catechol; resorcinol; hydroquinone; 4,4'-biphenol; 4,4'-ispropylidenebis(o-cresol); 4,4'-isopropylidenebis(2-phenyl phenol); alkylidenediphenols such as bisphenol "A"; pyrogallol; phloroglucinol; naphthalene diols; phenol; formaldehyde resins; resorcinol/formaldehyde resins; and phenol/resorcinol/formaldehyde resins. Mixtures of the above di-and polyacrylates may also be employed.

The vinyl monomers and polyfimctional acrylates may be used in varying amounts, preferably from about 20 to 50 based on the weight of the components which may be dissolved therein, and more preferably from about 30 to 40 weight percent.

The method of thickening a resin may be carried out using known equipment. Typically, for example, a resin containing active hydrogens is placed in a vessel, mixing tank, or other reactor along with a catalyst that will be mixed for a period lasting from about 5 to about 20 minutes. Subsequently, a polycarbodiimide which is present (typically dissolved) in an organic diluent is added to the above resin and is allowed to mix therein for a period lasting typically from about 3 to about 15 minutes. The mixture of resin containing active hydrogens and polycarbodiimide is applied onto a substrate, and the product is typically allowed to thicken for about 1 to about 48 hours or longer, more preferably from about 10 to about 24 hours. The thickening is preferably carried out at a temperature ranging from about 5° C. to about 60° C., more preferably from about 10° C. to about 35° C. After this time, the mixture has become thickened and the resin containing active hydrogens and the polycarbodiimide become chemically bound. An alternative way of mixing the resin containing active hydrogens and the polycarbodiimide may be accomplished by using a self balancing internal mix chopper system made commercially available from Magnum Industries from Clearwater, Fla. The thickened resin may then be crosslinked by employing known and appropriate techniques.

The thickened resin may be used in a number of end-use applications. For example, an unsaturated polyester resin may be added to continuous glass strands and allowed to thicken to form a rebar, or may be added to continuous glass or chopped glass to form a sheet molding compound (an SMC product) or added to woven fabrics to form a prepreg. The above end products are then allowed to thicken for about 1 to about 24 hours or longer. The resulting thickened resins may then be cured to yield materials having desirable physical properties.

In a preferred embodiment, the step of combining fibrous reinforcement material with the reactive mixture comprises combining filler material with the reactive mixture.

The reactive mixture may include an initiator to aid in the curing (crosslinking) of the thickened resin. A number of initiators may be employed, such as, for example, an organic peroxide. Exemplary organic peroxides that may be used include, for example, cumene hydroperoxide; methyl ethyl ketone peroxide; benzoyl peroxide; acetyl peroxide; 2,5-dimethylhexane-2,5-dihydroperoxide; tert-butyl peroxybenzoate; di-tert-butyl perphthalate; dicumyl peroxide; 2,5-dimethyl-2,5-bix(tert-butylperoxide)hexane; 2,5-dimethyl-2,5-bis(tert-butylperoxy)hexyne; bis(tert-butylperoxyisopropyl)benzene; ditert-butyl peroxide; 1,1-di(tert-amylperoxy)-cyclohexane; 1,1-di-(tert-butylperoxy)-3,3,5-trimethylcyclohexane; 1,1 -di-(tert-butylperoxy)-cyclohexane; 2,2-di-(tert-butylperoxy)butane; n-butyl-4,4-di(tert-butylperoxy)valerate; ethyl-3,3-di-(tert-amylperoxy) butyrate; ethyl-3,3-di(tert-butylperoxy)-butyrate; t-butyl peroxy-neodecanoate; di-(4-5-butyl-cyclohexyl)-peroxydicarbonate; lauryl peroxyde; 2,5-dimethyl-2,5-bis (2-ethyl-hexanoyl peroxy) hexane; t-amyl peroxy-2-ethylhexanoate; 2,2'-azobis(2-methylpropionitrile); 2,2'-azobis(2,4-methlbutanenitrile); and the like. Mixtures of any of the above may be used. The agent is preferably employed in an amount from about 1 to 2.5 percent based on the weight of the thickened resin, more preferably from about 1 to 1.5 percent by weight, and most preferably from about 1 to 1.25 percent by weight.

Suitable initiators used in curing the thickened resin may also encompass photoinitiators which may be activated upon exposure to a source of energy such as infrared, visible, or ultraviolet radiation. Examples of suitable photoinitiators include, but are not limited to, an aliphatic or aromatic diketone and a reducing agent (e.g., benzil and dimethyl benzyl amine); vicinal polyketaldonyl compounds (e.g., diacetyl benzil and benzil ketal); a-carbonyl alcohols (e.g., benzoin); acyloin ethers (e.g., benzoin methyl ether); polynuclear quinones (e.g., 9,10-antraquinone), and benzophenone. Preferably, the amount of photoinitiator ranges from about 0.005 to 5 percent based on the weight of the thickened resin. Suitable commercial photoinitiators include those available from Ciba-Geigy Corporation sold under the tradenames Irgacure 500, Irgacure 369, Irgacure 1700, Darocur 4265, and Irgacure 819. It should be appreciated that other commercial photoinitiators may be used for the purposes of the invention.

Suitable curing accelerators or promoters may also be used in conjunction with the initiator and include, for example, cobalt naphthanate, cobalt octoate, N,N-dimethyl aniline, N,N-dimethyl acetamide, and N,N-dimethyl p-toluidine. Mixtures of the above may be used. The curing accelerators or promoters are preferably employed in amounts from about 0.05 to about 1.0 percent by weight, more preferably from about 0.1 to 0.5 percent by weight, and most preferably from about 0.1 to 0.3 percent by weight of the thickened resin.

Additional additives known by the skilled artisan may be employed in the thickened resin composition of the present invention including, for example, paraffins, fatty acids, fatty acid derivatives, lubricants, and shrink-reducing additives. Various percentages of these additives can be used in the laminating resin composition.

The following examples are provided to illustrate the present invention, and should not be construed as limiting thereof. In the examples, resin tensile strength was measured in accordance with ASTM Standard D-638; flexural strength was measured in accordance with ASTM Standard D-79; barcol hardness was determined in accordance with ASTM Standard D-2583; elongation was measured in accordance with ASTM Standard D-638; and heat distortion was measured in accordance with ASTM Standard D-648. Weight average molecular weights were measured by gel permeation chromatography.

EXAMPLES 1–3

Preparation of Polycarbodiimides

The compositions and properties for Examples 1–3 are listed in Table 1. In general, the polycarbodiimides are prepared as follows. Toluene diisocyanate is placed in a reactor and n-Butanol is added at a rate to maintain the reaction temperature below 120° C. The temperature is then increased to 120° C. and maintained for thirty minutes to complete the first step of the reaction. After this step, a carbodiimide forming catalyst is added and the reaction is continued at 140° C. to complete the second step of the reaction. At this point, a small amount of unreacted isocyanate groups remain, and a second portion of n-Butanol is added. After 15 to 60 minutes, when no more isocyanate groups are detected by infrared spectroscopy, the temperature is decreased to about 100° C. and styrene which contains an inhibitor is added. The reaction mixture is cooled continuously until room temperature is reached, thus completing the reaction.

EXAMPLES 4–6

Preparation of Polycarbodiimides

Toluene diisocyanate, styrene and p-Benzoquinone in the amounts described in Table 2 are placed in a reactor and n-Butanol is added at a rate to maintain the reaction temperature below 120° C. The temperature is then increased to 120° C., and maintained for one-half hour to complete the first step of the reaction. After this step, a carbodiimide-forming catalyst is added and the reaction is continued at 140° C. to complete the second step of the reaction. At the point when a small amount of unreacted isocyanate groups remain, a second portion of n-Butanol is added. After 15 to 60 minutes, when no more isocyanate groups are detected by infrared spectroscopy, the temperature is decreased to about 100° C. and styrene is added. The reaction mixture is cooled continuously until room temperature is reached, thus completing the reaction.

EXAMPLES 7–10

Preparation of Polycarbodiimides

Toluene diisocyanate (or isophorone diisocyanate) together with a carbodiimide forming catalyst in the amounts shown in Table 3, are placed in a reactor at a temperature of 120° C. (180° C. for Isophorone). The reaction is continued until no unreacted isocyanate groups are left as determined by Infrared Spectroscopy. The temperature is decreased to about 100° C. and styrene which contains an inhibitor is then added. The reaction mixture is cooled continuously until room temperature is reached, thus completing the reaction.

EXAMPLE 11

Casting Properties of Thickened Materials.

Physical properties were determined using castings made from a mixture containing 1,104 grams of Dion 6694, available from Reichhold Chemicals, Durham, N.C., 94.0 grams of Example 8, and 12.0 grams of peroxide Trigonox 29B75 (available from Akzo Chemicals, Inc., Chicago, Ill.). The mixture was cured overnight at 60° C. and postcured at 130° C. for 2 hours. Results are listed in Example 11 in Table 4.

EXAMPLE 12–19

Physical Properties of Reinforced Thickened Materials

An unsaturated polyester is placed in a container and a peroxide catalyst is added and mixed for 15 minutes. A polycarbodiimide from Example 2 is added and mixed for 10 minutes. The final mixture is then added to continuous glass strands to form a sheet molding prepreg (an SMC Product). The product is then allowed to thicken for 4 to 8 hours, then molded in an SMC press at 135° C., and 110 tons for 5 minutes. The compositions and properties for Examples 12 through 19, are outlined in Table 5. The resins used in the testing are described below:

Dion® 6694 is a modified Bisphenol Fumarate available from Reichhold Chemicals, Durham, N.C.

Polylite® 31641 is an unsaturated polyester containing cyclohexane dimethanol, neopentyl glycol, tetrahydrophthalic anhydride, and maleic anhydride and is available from Reichhold Chemicals, Durham, N.C.

Polylite® 31612 is a propylene glycol furnarate unsaturated polyester available from Reichhold Chemicals, Durham, N.C.

Atlac® 387 is a modified bisphenol fumarate available from Reichhold Chemicals, Durham, N.C.

TABLE 1

Preparation of Polycarbodiimides.

| | Examples | | |
|---|---|---|---|
| Raw Materials | 1 | 2 | 3 |
| TDI, Wt. % | 48.78 | 48.78 | 48.78 |
| n-butanol, Wt. % | 13.143 | 13.489 | 13.627 |
| Phospholine Oxide*, Wt. % | 0.03 | 0.03 | 0.03 |
| p-Benzoquinone, Wt. % | 0.0112 | 0.0112 | 0.0112 |
| Styrene, Wt. % | 37.34 | 37.34 | 37.24 |
| n-Butanol, Wt. % | 0.692 | 0.346 | 0.208 |
| Viscosity, cps. LVF #3 @ 30 rpm | 420.0 | 224.0 | 280.0 |
| Mn (GPC) | 1370 | 1210 | 1110 |

*3-methyl-1-phenyl-2-phospholene-1-oxide.

TABLE 2

Preparation of Polycarbodiimides.

| | Examples | | |
|---|---|---|---|
| Raw Materials | 4 | 5 | 6 |
| TDI, Wt. % | 48.78 | 48.78 | 48.78 |
| Styrene, Wt. % | 20.00 | 20.00 | 20.00 |
| p-Benzoquinone, Wt. % | 0.03 | 0.03 | 0.03 |

TABLE 2-continued

Preparation of Polycarbodiimides.

| | Examples | | |
|---|---|---|---|
| Raw Materials | 4 | 5 | 6 |
| n-Butanol, Wt. % | 13.835 | 13.627 | 13.558 |
| Phospholene Oxide*, Wt. % | 0.0353 | 0.03 | 0.03 |
| Styrene, Wt % | 17.315 | 17.315 | 17.315 |
| n-Butanol, Wt. % | — | 0.207 | 0.277 |
| Viscosity, cps. LVF #3 @ 30 rpm | 392.0 | 336.0 | 480.0 |
| Mn (GPC) | 1230 | 1100 | 1140 |

*3-methyl-1-phenyl-2-phospholene-1-oxide.

TABLE 3

Preparation of Polycarbodiimides.

| Raw Materials | 7 | 8 | 9 | 10 |
|---|---|---|---|---|
| Isophorone, Wt. % | — | — | 51.408 | 51.404 |
| TDI, Wt. % | 52.40 | 48.78 | — | — |
| n-butanol, Wt. % | 7.44 | 13.835 | 8.568 | 8.567 |
| Phos. Oxide, Wt. % | 0.05 | 0.0327 | 0.025 | 0.0127 |
| p-Benzoquinone, Wt. % | 0.0115 | 0.0112 | 0.0116 | 0.0116 |
| Styrene, Wt. % | 40.105 | 37.34 | 40.00 | 40.00 |
| Viscosity, cps. RVF #4 @ 20 rpm | 150.0 | 200.0 | 300.0 | 364.0 |

TABLE 4

Physical Properties of Thickened Polyester Resin (⅛" Castings).

| | Dion ® 6694 | Example 11 |
|---|---|---|
| Flex. Strength, psi | 10,000 | 14,500 |
| Flex. Modulus, $10^6$ psi. | 0.48 | 0.45 |
| Ten. Strength, psi. | 6,600 | 7,500 |
| Ten. Modulus, $10^6$ psi. | 0.49 | 0.48 |
| Elongation, | 1.55 | 1.81 |
| Toughness (flex.) (in-lb/in$^3$) | 12.10 | 37.40 |
| Toughness (Ten.) (in-lb/in$^3$) | 59.80 | 73.60 |
| Barcol Hardness. | 50–55 | 49–53 |
| HDT @ 264 psi., ° C. | 136.00 | 138.00 |

TABLE 5

Physical Properties of Reinforced Thickened Unsaturated Polyesters*.

| | Examples | | | | | | | |
|---|---|---|---|---|---|---|---|---|
| | 12 | 13 | 14 | 15 | 16 | 17 | 18 | 19 |
| Dion ® 6694, wt. % | 92.0 | 87.4 | 82.8 | 78.2 | — | — | — | — |
| Polylite ® 31641, wt. % | — | — | — | — | 87.4 | 82.8 | — | — |
| Polylite ® 31612, wt. % | — | — | — | — | — | — | 87.4 | 82.6 |
| Atlac ® 387, wt. % | — | 4.6 | 9.2 | 13.8 | 4.6 | 9.2 | 4.6 | 9.2 |
| Example 2 | 8.0 | 8.0 | 8.0 | 8.0 | 8.0 | 8.0 | 8.0 | 8.0 |
| Flex. Strength, psi. | 38,130 | 38,600 | 37,400 | 37,400 | 25,300 | 27,200 | 30,500 | 33,100 |
| Flex. Modulus, $10^5$ psi | 17.7 | 18.8 | 17.4 | 17.4 | 17.0 | 17.2 | 17.5 | 17.1 |
| Ten. Strength, psi. | 27,900 | 25,400 | 24,700 | 23,400 | 17,000 | 19,500 | 23,000 | 24,300 |
| Ten. Modulus, $10^5$ psi | 17.20 | 16.80 | 15.80 | 16.80 | 13.50 | 14.70 | 16.20 | 16.10 |
| Elongation, % | 2.40 | 2.15 | 2.25 | 2.00 | 2.00 | 2.00 | 2.10 | 2.20 |
| Toughness (Flex.) (in-lb/in$^3$) | 74.5 | 70.7 | 72.0 | 72.0 | 33.9 | 43.5 | 59.7 | 62.2 |
| Toughness (Ten.) (in-lb/in$^3$) | 370.0 | 360.0 | 320.0 | 275.0 | 209.0 | 233.0 | 274.0 | 298.7 |
| Barcol Hardness | 68–75 | 68–75 | 65–75 | 68–75 | 68–75 | 70–78 | 68–73 | 65–75 |

*Glass content in all laminates was approximately 55% by weight.

In general, the resins display good strength, toughness, and elongation properties.

The invention has been described in detail with reference to its preferred embodiments and its examples. However, it will be apparent that numerous variations and modifications can be made without departure from the spirit and scope of the invention as described in the foregoing specification and claims.

That which is claimed:

1. A method of thickening a resin comprising:
   blending (1) an unsaturated polyester resin; (2) a polycarbodiimide; and (3) styrene to form a reactive mixture; and
   reacting the unsaturated polyester resin and the polycarbodiimide at a temperature between about 5° C. and 60° C. for a time period of from about 1 to about 48 hours such that the resin and polycarbodiimide become chemically bound to provide a thickened resin.

2. The method according to claim 1, wherein the reactive mixture comprises greater than about 5 percent by weight of polycarbodiimide.

3. The method according to claim 1, wherein the polycarbodiimide is formed from a reaction between an isocyanate-containing intermediate and a diisocyanate.

4. The method according to claim 3, wherein the isocyanate-containing intermediate is formed from a reaction between a component containing active hydrogens and a diisocyanate.

5. The method according to claim 4, wherein the component containing active hydrogens is selected from the group consisting of alcohols, amines, thiols, phenols, silanol, —P—OH, —P—H, and mixtures thereof.

6. The method according to claim 4, wherein the component containing active hydrogens is an alcohol.

7. The method according to claim 1, further comprising the step of curing the chemically bound resin and polycarbodiimide to form a cured resin material.

8. The method according to claim 7, wherein said curing step is carried out in the presence of an initiator.

9. The method according to claim 8, wherein the initiator is an organic peroxide initiator selected from the group consisting of cumene hydroperoxide; methyl ethyl ketone peroxide; benzoyl peroxide; acetyl peroxide; 2,5-dimethylhexane-2,5-dihydroperoxide; tert-butyl peroxybenzoate; di-tert-butyl perphthalate; dicumyl peroxide; 2,5-dimethyl-2,5-bis(tert-butylperoxide)hexane; 2,5-dimethyl-2,5-bis(tert-butylperoxy)hexyne; bis(tert-butylperoxyisopropyl)benzene; ditert-butyl peroxide; 1,1-di(tert-amylperoxy)-cyclohexane; 1,1-di-(tert- butylperoxy)-3,3,5-trimethylcyclohexane; 1,1-di-(tert-butylperoxy)-cyclohexane; 2,2-di-(tert-butylperoxy)butane; n-butyl4,4-di(tert-butylperoxy)valerate; ethyl-3,3-di-(tert-amylperoxy)butyrate; ethyl-3,3-di(tert-butylperoxy)-butyrate; t-butyl peroxy-neodecanoate; di-(4-5-butyl-cyclohexyl)-peroxydicarbonate; lauryl peroxyde; 2,5-dimethyl-2,5-bis(2-ethyl-hexanoyl peroxy) hexane; t-amyl peroxy-2-ethylhexanoate; 2,2'-azobis(2-methylpropionitrile); 2,2'-azobis(2,4-methylbutanenitrile); and mixtures thereof.

10. A method of forming a reinforced product comprising:

blending (1) an unsaturated polyester resin; (2) a polycarbodiimide; and (3) styrene to form a reactive mixture;

combining fiberglass with the reactive mixture;

reacting the unsaturated polyester resin and the polycarbodiimide at a temperature between about 5° C. and 60° C. for a time period of from about 1 to about 48 hours such that the resin and polycarbodiimide become chemically bound to provide a thickened resin; and curing the chemically bound resin and the polycarbodiimide to form a cured reinforced product.

11. The method according to claim 10, wherein the reactive mixture comprises greater than about 5 percent by weight of polycarbodiimide.

12. The method according to claim 10, wherein the polycarbodiimide is formed from a reaction between an isocyanate-containing intermediate and a diisocyanate.

13. The method according to claim 12, wherein the isocyanate-containing intermediate is formed from a reaction between a component containing active hydrogens and a diisocyanate.

14. The method according to claim 13, wherein the component containing active hydrogens is selected from the group consisting of alcohols, amines, thiols, phenols, silanol, —P—OH, —P—H, land mixtures thereof.

15. The method according to claim 13, wherein the component containing active hydrogens is an alcohol.

16. The method according to claim 13, wherein said curing step is carried out in the presence of an initiator.

17. The method according to claim 16, wherein the initiator is an organic peroxide initiator selected from the group consisting of cumene hydroperoxide; methyl ethyl ketone peroxide; benzoyl peroxide; acetyl peroxide; 2,5-dimethylhexane-2,5-dihydroperoxide; tert-butyl peroxybenzoate; di-tert-butyl perphthalate; dicumyl peroxide; 2,5-dimethyl-2,5-bix(tert-butylperoxide)hexane; 2,5-dimethyl-2,5-bis(tert-butylperoxy)hexyne; bis(tert-butylperoxyisopropyl)benzene; ditert-butyl peroxide; 1,1-di(tert-amylperoxy)-cyclohexane; 1,1-di-(tert-butylperoxy)-3,3,5-trimethylcyclohexane; 1,1-di-(tert-butylperoxy)-cyclohexane; 2,2-di-(tert-butylperoxy)butane; n-butyl4,4-di(tert-butylperoxy)valerate; ethyl-3,3-di-(tert-amylperoxy)butyrate; ethyl-3,3-di(tert-butylperoxy)-butyrate; t-butyl peroxy-neodecanoate; di-(4-5-butyl-cyclohexyl)-peroxydicarbonate; lauryl peroxyde; 2,5-dimethyl-2,5-bis(2-ethyl-hexanoyl peroxy) hexane; t-amyl peroxy-2-ethylhexanoate; 2,2'-azobis(2-methylpropionitrile); 2,2'-azobis(2,4-methlbutanenitrile); and mixtures thereof.

\* \* \* \* \*

UNITED STATES PATENT AND TRADEMARK OFFICE
CERTIFICATE OF CORRECTION

PATENT NO. : 6,204,342 B1
DATED : March 20, 2001
INVENTOR(S) : Hildeberto Nava

It is certified that error appears in the above-identified patent and that said Letters Patent is hereby corrected as shown below:

<u>Title page,</u>
Item [56], the following references should be listed under U.S. PATENT DOCUMENTS:

| | | | |
|---|---|---|---|
| -- 3,621,093 | 11/16/71 | Svoboda et al. | 264/331 |
| 4,062,826 | 10/31/72 | Kroekel | 260/40 |
| 4,076,945 | 12/13/77 | Hutchinson et al. | 260/40 TN |
| 4,128,844 | 04/10/79 | von Bonin et al. | 260/874 |
| 4,232,133 | 02/14/78 | Ferrarini et al. | 260/859R |
| 4,289,684 | 02/28/78 | Elmer | 560/25 |
| 4,673,706 | 12/05/78 | McCluskey | 260/862 |
| 4,871,811 | 11/04/80 | Ferrarini, Jr. et al. | 525/452 |
| 3,701,748 | 04/07/81 | Iseler et al. | 260/40 R |
| 4,073,828 | 09/15/81 | Kallaur | 260/40 R |
| 4,128,601 | 06/25/85 | Atkins et al. | 523/511 |
| 4,260,538 | 06/16/87 | Atkins | 525/31 |
| 4,525,498 | 01/12/88 | Muller et al. | 514/785 |
| 4,719,239 | 10/03/89 | Gaku et al. | 525/148 |
| 4,961,894 | 10/09/90 | Yabe et al. | 264/259 -- |

The following references should be listed under FOREIGN PATENT DOCUMENTS:
-- 1373278    11/06/74    Great Britain --

<u>Column 13,</u>
Line 32, after "2,2-di-(tert-butylperoxy)butane;" please delete "n-butyl14,4-di(tert-butylperoxy)valerate" and insert
-- n-butyl-4,4-di(tert-butylperoxy)valerate --

UNITED STATES PATENT AND TRADEMARK OFFICE
CERTIFICATE OF CORRECTION

PATENT NO. : 6,204,342 B1
DATED : March 20, 2001
INVENTOR(S) : Hildeberto Nava

It is certified that error appears in the above-identified patent and that said Letters Patent is hereby corrected as shown below:

Column 14,
Line 24, after "claim" please delete "13" and replace with -- 10 --
Line 37, after "2,2-di-(tert-butylperoxy)butane;" please delete
"n-butyl14,4-di(tert-butylperoxy)valerate" and insert
-- n-butyl-4,4-di(tert-butylperoxy)valerate --

Signed and Sealed this

Fourteenth Day of October, 2003

JAMES E. ROGAN
*Director of the United States Patent and Trademark Office*